United States Patent
Carroll et al.

(10) Patent No.: US 12,078,714 B2
(45) Date of Patent: Sep. 3, 2024

(54) ANGULAR RESOLUTION REFINEMENT IN A VEHICLE RADAR FOR OBJECT IDENTIFICATION

(71) Applicant: BDCM A2 LLC, Dover, DE (US)

(72) Inventors: Kenneth Ray Carroll, Huntington Beach, CA (US); Kaice Theodore Reilly, San Diego, CA (US)

(73) Assignee: BDCM A2 LLC, Dover, DE (US)

( * ) Notice: Subject to any disclaimer, the term of this patent is extended or adjusted under 35 U.S.C. 154(b) by 49 days.

(21) Appl. No.: 17/143,147

(22) Filed: Jan. 6, 2021

(65) Prior Publication Data

US 2021/0208269 A1 Jul. 8, 2021

Related U.S. Application Data

(60) Provisional application No. 62/957,755, filed on Jan. 6, 2020.

(51) Int. Cl.
*G01S 13/44* (2006.01)
*G01S 7/41* (2006.01)
*G01S 13/931* (2020.01)

(52) U.S. Cl.
CPC .......... *G01S 13/4454* (2013.01); *G01S 7/417* (2013.01); *G01S 13/4427* (2013.01); *G01S 13/931* (2013.01)

(58) Field of Classification Search
CPC ............. G01S 13/4427; G01S 13/4454; G01S 13/931; G01S 7/417
See application file for complete search history.

(56) References Cited

U.S. PATENT DOCUMENTS 6,337,656 B1 * 1/2002 Natsume ................. G01S 13/44
342/149
6,492,949 B1 12/2002 Breglia et al.
(Continued)

FOREIGN PATENT DOCUMENTS

JP 2002174680 A * 6/2002

OTHER PUBLICATIONS

Translation JP2002174680 (Year: 2002).*
(Continued)

*Primary Examiner* — Timothy A Brainard
(74) *Attorney, Agent, or Firm* — Dinsmore & Shohl LLP

(57) ABSTRACT

Examples disclosed herein relate to a radar system and method of angular resolution refinement for use in autonomous vehicles. The method includes transmitting a radio frequency (RF) beam to a surrounding environment with a beamsteering radar system and receiving return RF beams from the surrounding environment. The method also includes generating radar data from the return RF beams and detecting objects from the radar data, and determining a direction of arrival of each of object and determining an angular distance between the objects. The method further includes initiating a guard channel detection based at least on the angular distance and determining gain amplitudes of the return RF beams, and determining a null between the objects from the gain amplitudes and resolving the objects as separate objects based at least on the determined null. The method also includes determining a refined direction of arrival of the objects based at least on the resolved objects.

20 Claims, 11 Drawing Sheets

(56) References Cited

U.S. PATENT DOCUMENTS

| | | | | |
|---|---|---|---|---|
| 9,110,170 | B1* | 8/2015 | Woollard | G01S 13/89 |
| 10,205,457 | B1 | 2/2019 | Josefsberg et al. | |
| 2010/0214156 | A1* | 8/2010 | Karam | G01S 13/4454 |
| | | | | 342/149 |
| 2018/0253974 | A1* | 9/2018 | Szulc | G01S 17/58 |
| 2020/0098126 | A1* | 3/2020 | Ozawa | G01S 13/931 |
| 2020/0309899 | A1* | 10/2020 | Jonas | G01S 13/931 |
| 2020/0355817 | A1* | 11/2020 | Gillian | G06N 3/08 |

OTHER PUBLICATIONS

J. Ala-Laurinaho et al., "2-D Beam-Steerable Integrated Lens Antenna System for 5G E-Band Access and Backhaul," in IEEE Transactions on Microwave Theory and Techniques, vol. 64, No. 7, pp. 2244-2255, Jul. 2016.

S. Patole et al., "Automotive Radars: A Review of Signal Processing Techniques," Signal Processing for Smart Vehicle Technologies: Part 2, in IEEE Signal Processing Magazine, pp. 22-35, Mar. 2017.

S.-H. Jeong, et. al., "A Multi-Beam and Multi-Range Radar With FMCW and Digital Beam Forming for Automotive Applications," Progress in Electromagnetics Research, vol. 124, pp. 285-299, 2012.

D.-S. Kim et al., "A Design of Switch Array Antenna with Performance Improvement for 77 GHz Automotive FMCW Radar," Progress In Electromagnetics Research B, vol. 66, 107-121, 2016.

R. Rouveure et al., "Radar Imager for Perception and Mapping in Outdoor Environments," Advanced Concepts for Intelligent Vision Systems: 11th International Conference (ACIVS), Bordeaux, France, pp. 618-628, Sep. 2009.

S. Carpenter, "Autonomous Vehicle Radar: Improving Radar Performance with Simulation," White Paper, High Frequency/ Electronics Business Unit, ANSYS, Canonsburg, PA, pp. 1-14, 2017.

H. Zhou et al., "Evolution of Satellite Communication Antennas on Mobile Ground Terminals," International Journal of Antennas and Propagation, vol. 2015, Article ID 436250, pp. 1-14, Jul. 2015.

J. Schoebe et al., "Planar Antenna Technology for mm-Wave Automotive Radar, Sensing, and Communications," Radar Technology, Book edited by: Dr. Guy Kouemou, ISBN 978-953-307-029-2, In Tech, Ch. 15, pp. 298-319, Jan. 2010.

S. Haykin, "Radar Vision," IEEE International Conference on Radar, Arlington, VA, pp. 585-588, May 1990.

"Implementing Digital Processing for Automotive Radar Using SoC FPGAs."White Paper, Altera Corporation, pp. 1-16, Dec. 2013.

* cited by examiner

ANGULAR RESOLUTION REFINEMENT IN A VEHICLE RADAR FOR OBJECT IDENTIFICATION

CROSS-REFERENCE TO RELATED APPLICATIONS

This application claims priority from U.S. Provisional Application No. 62/957,755, filed on Jan. 6, 2020, and incorporated by reference in its entirety.

BACKGROUND

Autonomous driving is quickly moving from the realm of science fiction to becoming an achievable reality. Already in the market are Advanced-Driver Assistance Systems ("ADAS") that can automate, adapt, and enhance vehicles for safety and better driving. The next step will be vehicles that increasingly assume control of the driving functions, such as steering, accelerating, braking, and monitoring the surrounding environment and adjusting driving conditions to, for example, avoid traffic, crossing pedestrians, animals, and so on, by changing lanes or decreasing speed when needed. The requirements for object and image detection are critical to enable the aforementioned enhancements, particularly to control and perform the driving functions within a short enough response time required to capture, process and turn the acquired data into action. All these enhancements are to be achieved in autonomous driving while ensuring accuracy, consistency and cost optimization for deploying in the vehicles.

An aspect of making this work is the ability to detect, identify, and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment. Therefore, there is a need for vehicular systems that provide improved dynamic, responsive, and intelligent functionality for autonomous driving.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Angular resolution refinement in a vehicle radar for object identification is disclosed. Radar angular resolution, as generally described herein, is the minimum distance between two equally large targets at the same range which the radar is able to distinguish and separate from each other. The radar disclosed herein is a beam steering radar capable of generating narrow, directed beams that can be steered to any angle (i.e., from 0° to 360°) across a Field of View ("FoV") to detect objects. The beams are generated and steered in the analog domain, while processing of received radar signals for object identification is performed with advanced signal processing and machine learning techniques. In various implementations, the angle-of-arrival ("AoA") of a received radar signal is computed using both a phase-comparison monopulse technique and guard band channels to effectively resolve multiple objects inside a main beam with a high degree of accuracy and angular resolution.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
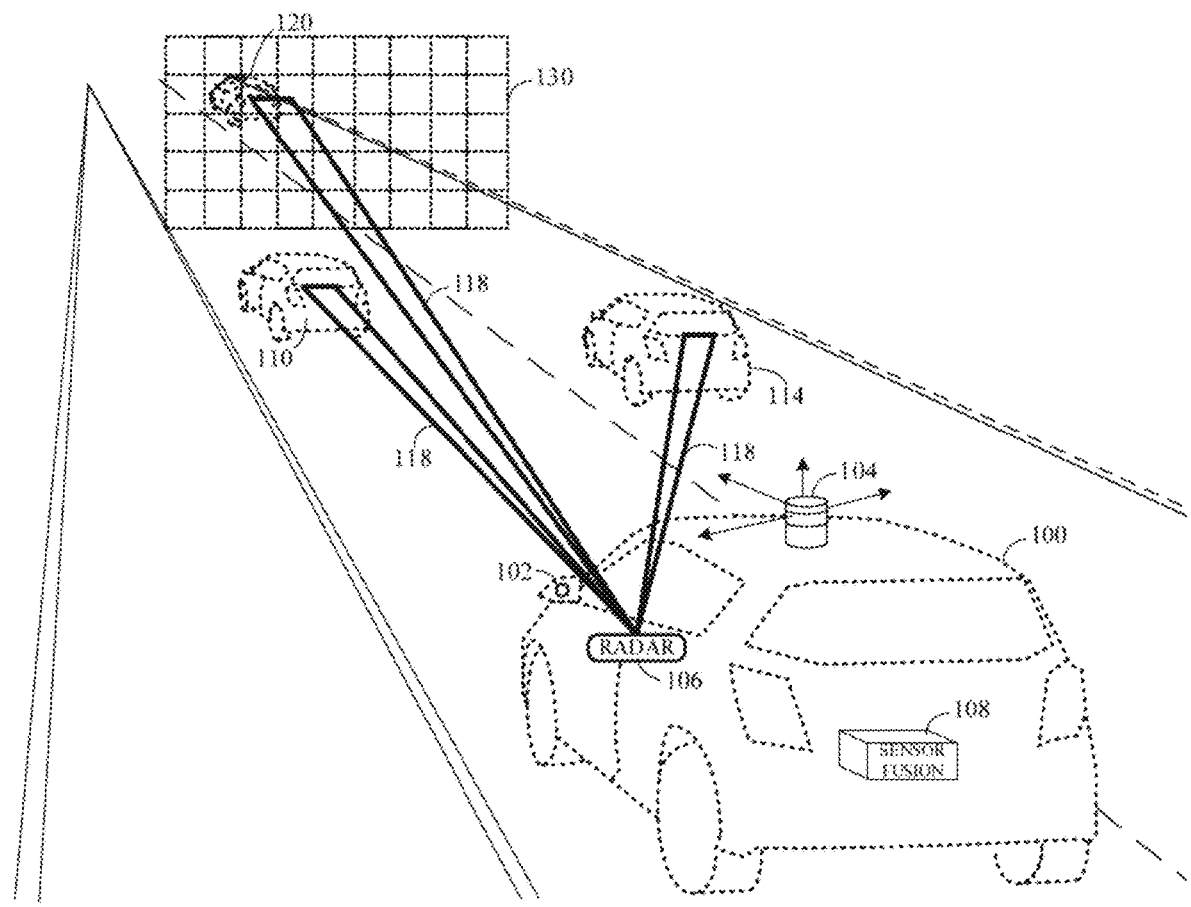
FIG. 1 illustrates an example environment in which a beam steering radar in an autonomous vehicle is used to detect and identify objects, according to various implementations of the subject technology.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100 but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras can capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long-range capabilities of the radar 106 enable a sensor fusion module 108 in the ego vehicle 100 to enhance its object detection and identification.

As illustrated, the beam steering radar 106 can detect both vehicle 120 at a far range (e.g., greater than 350) m) as well as vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar (LRR) mode that enables the detection of long-range objects in a very short time to then focus on obtaining finer velocity resolution for the detected vehicles. Although not described herein, radar 106 is capable of time-alternatively reconfiguring between LRR and Short-Range Radar (SRR) modes. The SRR mode enables a wide beam with lower gain, and yet can be configured to make quick decisions to avoid an accident, assist in parking and downtown travel, and capture information about a broad area of the environment. The LRR mode enables a narrow, directed beam and long distance, having high gain: this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
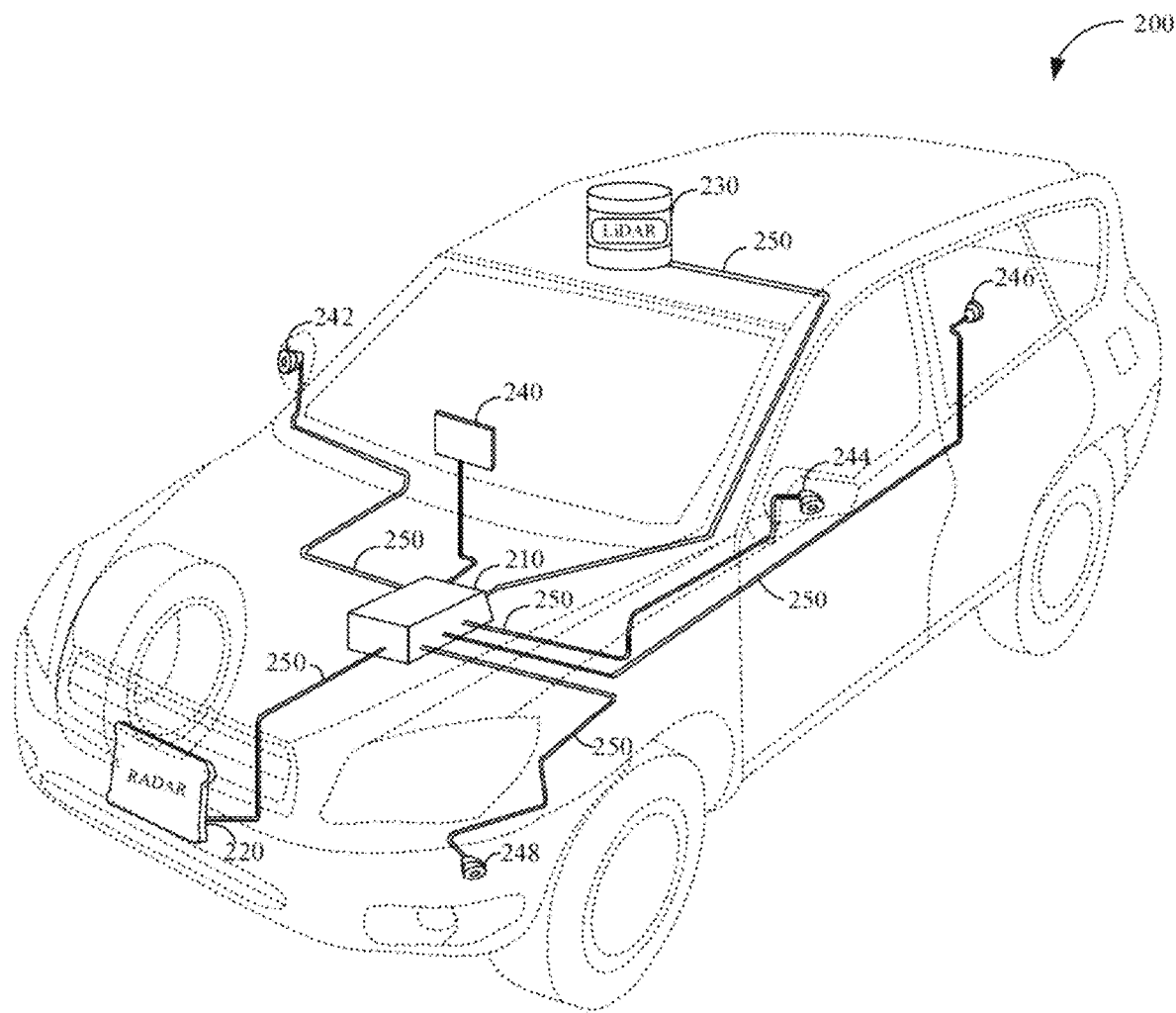
FIG. 2 illustrates an example network environment in which a radar system may be implemented in accordance with one or more implementations of the subject technology.

Attention is now directed to FIG. 2, which illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may include a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a lidar system having one or more lidar sensors, the electronic device 240 is depicted as an entertainment interface unit, and the electronic devices 242, 244, 246, 248 are depicted as camera devices, such as forward-view; rear-view and side-view cameras. In one or more implementations, the electronic device 210 and/or one or more of the electronic devices 242, 244, 246, 248 may be communicatively coupled to a public communication network, such as the Internet.

The electronic device 210 includes a multi-sensor fusion platform for processing data acquired by electronic devices 220, 230, 240, 242, 244, 246, and 248, including labeling objects detected and identified in the acquired data. Such objects may include structural elements in the environment near the vehicle such as roads, walls, buildings, road center medians and other objects, as well as other vehicles, pedestrians, bystanders, cyclists, plants, trees, animals and so on.

Figure 3:
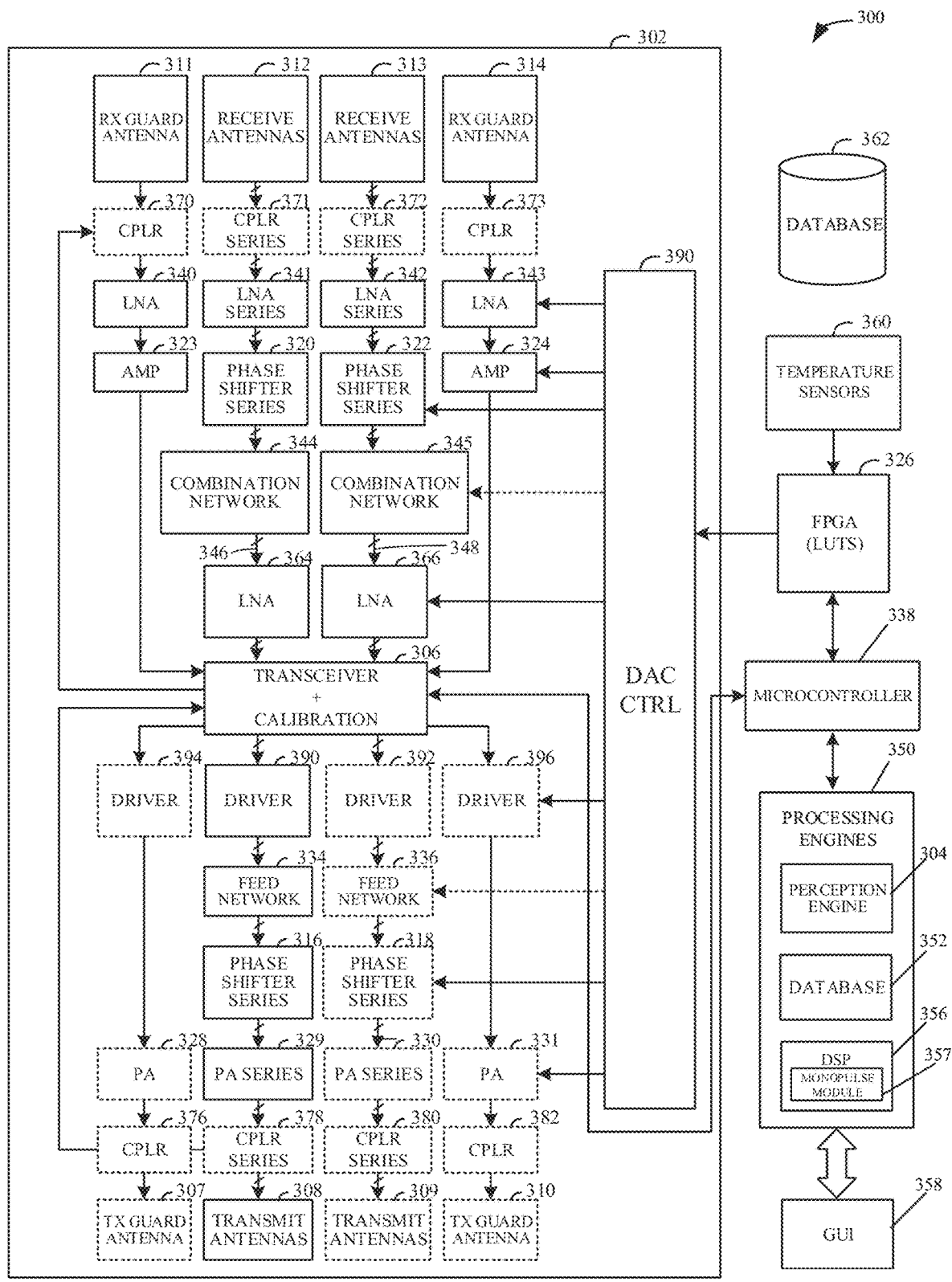
FIG. 3 illustrates a schematic diagram of a beam steering radar system as in FIG. 2 and in accordance with one or more implementations of the subject technology.

FIG. 3 illustrates a schematic diagram of a radar system 300 in accordance with various implementations of the subject technology. The radar module 300 includes a radar module 302 that comprises a receive chain and a transmit chain. The receive chain includes receive antennas 312 and 313, receive guard antennas 311 and 314, couplers 370, 371, 372, and 373 (collectively 370-373), low-noise amplifiers (LNAs) 340, 341, 342, and 343 (collectively 340-343), phase shifter (PS) circuits 320 and 322, amplifiers 323, 324, 364 and 366, and combination networks 344 and 345. The transmit chain includes drivers 390, 392, 394 and 396, feed networks 334 and 336, PS circuits 316 and 318, power amplifiers 328, 329, 330, and 331 (collectively 328-331), couplers 376, 378, 380 and 382, transmit antennas 308 and 309, and transmit guard antennas 307 and 310. The radar module 302 also includes a transceiver 306, a digital-to-analog (DAC) controller 390, a Field-Programmable Gate Array (FPGA) 326, a microcontroller 338, processing engines 350, a Graphical User Interface (GUI) 358, temperature sensors 360 and a database 362. The processing engines 350 includes perception engine 304, database 352 and Digital Signal Processor (DSP) 356. The DSP 356 includes a monopulse module 357. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

In some implementations, the radar system 300 of FIG. 3 may include one or more of the FPGA 326, the microcontroller 338, the processing engines 350, the temperature sensors 360 or the database 362. In some implementations, the electronic device 340 of FIG. 3 is, or includes at least a portion of, the GUI 358.

Radar module 302 is capable of both transmitting RF signals within a FoV and receiving the reflections of the transmitted signals as they reflect from objects in the FoV. With the use of analog beamforming in radar module 302, a single transmit and receive chain can be used effectively to form a directional, as well as a steerable, beam. A transceiver 306 in radar module 302 can generate signals for transmission through a series of transmit antennas 308 and 309 as well as manage signals received through a series of receive antennas 312 and 313. Beam steering within the FoV is implemented with phase shifter (PS) circuits 316 and 318 coupled to the transmit antennas 308 and 309, respectively, on the transmit chain and PS circuits 320) and 322 coupled to the receive antennas 312 and 313, respectively, on the receive chain. Careful phase and amplitude calibration of the transmit antennas 308, 309 and receive antennas 312, 313 can be performed in real-time with the use of couplers integrated into the radar module 302 as described in more detail below. In other implementations, calibration is performed before the radar is deployed in an ego vehicle and the couplers may be removed.

The use of PS circuits 316, 318 and 320, 322 enables separate control of the phase of each element in the transmit antennas 308, 309 and receive antennas 312, 313. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 300 with a significantly longer detection range.

A major challenge with implementing analog beam steering is to design PSs to operate at 77 GHZ. PS circuits 316, 318 and 320, 322 solve this problem with a reflective PS design implemented with a distributed varactor network fabricated using suitable semiconductor materials, such as Gallium-Arsenide (GaAs) materials, among others. Each PS circuit 316, 318 and 320, 322 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 316, 318 and 320, 322 is controlled by a Field Programmable Gate Array (FPGA) 326, which provides a series of voltages to the PSs in each PS circuit that results in a series of phase shifts.

The DAC controller 390 is coupled to each of the LNAs 340-343, the amplifiers 323, 324, 364, 366, PS circuits 316, 318, 320, 322, the drivers 390, 392, 394, 396, and the power amplifiers (PAS) 328-331. In some aspects, the DAC controller 390 is coupled to the FPGA 326, and the FPGA 326 can drive digital signaling to the DAC controller 390 to provide analog signaling to the LNAs 340-343, the amplifiers 323, 324, 364, 366, PS circuits 316, 318, 320, 322, the drivers 390, 392, 394, 396, and the PAs 328-331. In some implementations, the DAC controller 390 is coupled to the combination networks 344, 345 and to the feed networks 334, 336.

In various examples, an analog control signal is applied to each PS in the PS circuits 316, 318 and 320, 322 by the DAC controller 390 to generate a given phase shift and provide beam steering. The analog control signals applied to the PSs in PS circuits 316, 318 and 320, 322 are based on voltage values that are stored in Look-up Tables (LUTs) in the FPGA 326. These LUTs are generated by an antenna calibration process that determines which voltages to apply to each PS to generate a given phase shift under each operating condition. Note that the PSs in PS circuits 316, 318 and 320, 322 can generate phase shifts at a very high resolution of less than one degree. This enhanced control over the phase allows the transmit and receive antennas in radar module 302 to steer beams with a very small step size, improving the capability of the radar system 300 to resolve closely located targets at small angular resolution.

In various examples, each of the transmit antennas 308, 309 and the receive antennas 312, 313 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the transmit antennas 308, 309 and the receive antennas 312, 313 may be used to implement specific designs and meet specific constraints.

The transmit chain in the radar module 302 starts with the transceiver 306 generating RF signals to prepare for transmission over-the-air by the transmit antennas 308 and 309. The RF signals may be, for example, Frequency-Modulated Continuous Wave (FMCW) signals. An FMCW signal enables the radar system 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 306, the FMCW signals are fed to driver 390. From the driver 390, the signals are divided and distributed through feed network 334, which forms a power divider system to divide an input signal into multiple signals, one for each element of the transmit antennas 308. The feed network 334 may divide the signals so power is equally distributed among them or alternatively, so power is distributed according to another scheme, in which the divided signals do not all receive the same power. Each signal from the feed network 334 is then input to the PS circuit 316, where the FMCW signals are phase shifted based on control signaling from the DAC controller 390 (corresponding to voltages generated by the FPGA 326 under the direction of microcontroller 338), and then transmitted to the PA series 329. The amplified signaling from the PA series 329 is coupled to the transmit antennas 308. Signal amplification is needed for the FMCW signals to reach the long ranges desired for object detection, as the signals attenuate as they radiate by the transmit antennas 308.

In some implementations, the radar system 300 optionally includes multiple transmit chains. For example, a first transmit chain includes driver 390, feed network 334, phase shifter series 316, PA series 329, and transmit antennas 308, and a second transmit chain includes driver 392, feed network 336, phase shifter series 318, PA series 330, and transmit antennas 309. Once the FMCW signals are generated by the transceiver 306, the FMCW signals are fed to drivers 390 and 392. From the drivers 390 and 392, the signals are divided and distributed through feed networks 334 and 336, respectively, which form a power divider system to divide an input signal into multiple signals, one for each element of the transmit antennas 308 and 309, respectively. The feed networks 334 and 336 may divide the signals so power is equally distributed among them or alternatively, so power is distributed according to another scheme, in which the divided signals do not all receive the same power. Each signal from the feed networks 334 and 336 is then input to the PS circuits 316 and 318, respectively, where the FMCW signals are phase shifted based on control signaling from the DAC controller 390 (corresponding to voltages generated by the FPGA 326 under the direction of microcontroller 338), and then transmitted to the PAs 329 and 330. The amplified signaling from PAs 329 and 330 are respectively coupled to the transmit antennas 308 and 309. Signal amplification is needed for the FMCW signals to reach the long ranges desired for object detection, as the signals attenuate as they radiate by the transmit antennas 308 and 309.

In some implementations, the couplers 378 and 380 are optionally coupled to the PAs 329 and 330 for calibration purposes. For example, from the PAs 329 and 330, the FMCW signals are fed to couplers 378 and 380, respectively, to generate calibration signaling that is fed back to the transceiver 306. From the couplers 378 and 380, the FMCW signals are transmitted through transmit antennas 308 and 309 to radiate the outgoing signaling. In some implementations, the PS circuit 316 is coupled to the transmit antennas 308 through the PA 329 and coupler 378, and the PS circuit 318 is coupled to the transmit antennas 309 through the PA 330 and coupler 380.

In some implementations, the transceiver 306 feeds the FMCW signals to drivers 394 and 396, which are then fed to PAs 328 and 332 and to the couplers 376 and 382. In some implementations, the couplers 376 and 382 are coupled between the PAs 328 and 331 for calibration purposes. From these couplers, the FMCW signals are fed to the transmit guard antennas 307 and 310 for side lobe cancelation of the transmission signal. In some embodiments, the transmit guard antennas 307 and 310 are optionally coupled to the PAs 328 and 331 and to the drivers 394 and 396.

The microcontroller 338 determines which phase shifts to apply to the PSs in PS circuits 316, 318, 320 and 322 according to a desired scanning mode based on road and environmental scenarios. Microcontroller 338 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 338 to adjust the scan parameters at a next scan to focus on a given area of the FoV or to steer the beams to a different direction.

In various examples and as described in more detail below, radar system 300 operates in one of various modes, including a full scanning mode and a selective scanning mode, among others. In a full scanning mode, the transmit antennas 308, 309 and the receive antennas 312, 313 can scan a complete FoV with small incremental steps. Even though the FoV may be limited by system parameters due to increased side lobes as a function of the steering angle, radar system 300 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 300 scans around an area of interest by steering to a desired angle and then scanning around that angle. This ensures the radar system 300 is to detect objects in the area of interest without wasting any processing or scanning cycles illuminating areas with no valid objects. Since the radar system 300 can detect objects at a long distance, e.g., 300 m or more at boresight, if there is a curve in a road, direct measures do not provide helpful information. Rather, the radar system 300 steers along the curvature of the road and aligns its beams towards the area of interest. In various examples, the selective scanning mode may be implemented by changing the chirp slope of the FMCW signals generated by the transceiver 306 and by shifting the phase of the transmitted signals to the steering angles needed to cover the curvature of the road.

Objects are detected with radar system 300 by reflections or echoes that are received at the receive antennas 312 and 313. In some implementations, the received signaling is fed directly to the LNAs 341 and 342. The LNAs 341 and 342 are positioned between the receive antennas 312 and 313 and PS circuits 320 and 322, which include PSs similar to the PSs in PS circuits 316 and 318. In other implementations, the received signaling is then fed to couplers 372 and 373 using feedback calibration signaling from the transceiver 306. The couplers 370, 371, 372, and 373 can allow probing to the receive chain signal path during a calibration process. From the couplers 372 and 373, the received signaling is fed to LNAs 341 and 342.

For receive operation, PS circuits 320 and 322 create phase differentials between radiating elements in the receive antennas 312 and 313 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 312 and 313. Similar to PS circuits 316, 318 on the transmit chain, PS circuits 320, 322 are controlled by the DAC controller 390, which provides control signaling to each PS to generate the desired phase shift. In some implementations, the FPGA 326 can provide bias voltages to the DAC controller 390 to generate the control signaling to PS circuits 320, 322.

The receive chain then combines the signals fed by the PS circuits 320 and 322 at the combination networks 344 and 345, respectively, from which the combined signals propagate to the amplifiers 364 and 366 for signal amplification. The amplified signal is then fed to the transceiver 306 for receiver processing. Note that as illustrated, the combination networks 344 and 345 can generate multiple combined signals 346 and 348, of which each signal combines signals from a number of elements in the receive antennas 312 and 313, respectively. In one example, the receive antennas 312 and 313 include 128 and 34 radiating elements partitioned into two 34-element and 32-element clusters, respectively. For example, the signaling fed from each cluster is combined in a corresponding combination network (e.g., 344, 345) and delivered to the transceiver 306 in a separate RF transmission line. In this respect, each of the combined signals 346 and 348 can carry two RF signals to the transceiver 306, where each RF signal combines signaling from the 34-element and 32-element clusters of the receive antennas 312 and 313. Other examples may include 8, 26, 34, or 32 elements, and so on, depending on the desired configuration. The higher the number of antenna elements, the narrower the beam width. In some implementations, the combination network 344 is coupled to the receive antennas 312 and the combination network 345 is coupled to receive antennas 313. In some embodiments, the receive guard antennas 311 and 314 feed the receiving signaling to couplers 370) and 374, respectively, which are then fed to LNAs 340 and 343. The filtered signals from the LNAs 340 and 343 are fed to amplifiers 323 and 324, respectively, which are then fed to the transceiver 306 for side lobe cancelation of the received signals by the receiver processing.

In some implementations, the radar module 302 includes receive guard antennas 311 and 314 that generate a radiation pattern separate from the main beams received by the 34-element receive antennas 312 and 313. The receive guard antennas 311 and 314 are implemented to effectively eliminate side-lobe returns from objects. The goal is for the receive guard antennas 311 and 314 to provide a gain that is higher than the side lobes and therefore enable their elimination or reduce their presence significantly. The receive guard antennas 311 and 314 effectively act as a side lobe filter. Similar, the radar module 302 includes transmit guard antennas 307 and 310 to eliminate side lobe formation or reduce the gain generated by transmitter side lobes at the time of a transmitter main beam formation by the transmit antennas 308 and 309.

Once the received signals are received by transceiver 306, the received signals are processed by processing engines 350. Processing engines 350 include perception engine 304 that detects and identifies objects in the received signal with one or more neural networks using machine learning or computer vision techniques, database 352 to store historical and other information for radar system 300, and the DSP engine 354 with an Analog-to-Digital Converter (ADC) module to convert the analog signals from transceiver 306 into digital signals that can be processed by the monopulse module 357 to determine angle of arrival (AoA) information for the localization, detection and identification of objects by perception engine 304. In one or more implementations, DSP engine 356 may be integrated with the microcontroller 338 or the transceiver 306.

Radar system 300 also includes a Graphical User Interface (GUI) 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In some implementations, the GUI 358 can provide for display a rendering of roadmap data that indicates range, velocity and AoA information for detected objects in the FoV. In some examples, the roadmap data can delineate between traffic moving toward the radar system 300 and traffic moving away (or receding from) the radar system 300 using a predetermined angular resolution (e.g., at or less than 1.6°) with angular precision based at least on the monopulse and/or guard channel detection techniques. In addition, radar system 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar system 300 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 304 controls further operation of the transmit antennas 308 and 309 by, for example, providing an antenna control signal containing beam parameters for the next RF beams to be radiated from cells in the transmit antennas 308.

In operation, the microcontroller 338 is responsible for directing the transmit antennas 308 and 309 to generate RF beams with determined parameters such as beam width, transmit angle, and so on. The microcontroller 338 may, for example, determine the parameters at the direction of perception engine 304, which may at any given time determine to focus on a specific area of a FoV upon identifying targets of interest in the ego vehicle's path or surrounding environment. The microcontroller 338 determines the direction, power, and other parameters of the RF beams and controls the transmit antennas 308 and 309 to achieve beam steering in various directions. The microcontroller 338 also determines a voltage matrix to apply to reactance control mechanisms coupled to the transmit antennas 308 and 309 to achieve a given phase shift. In some examples, the transmit antennas 308 and 309 are adapted to transmit a directional beam through active control of the reactance parameters of the individual cells that make up the transmit antennas 308 and 309.

Next, the transmit antennas 308 and 309 radiate RF beams having the determined parameters. The RF beams are reflected from targets in and around the ego vehicle's path (e.g., in a 360° field of view) and are received by the transceiver 306. The receive antennas 312 and 313 send the received 4D radar data to the perception engine 304 for target identification.

In various examples, the perception engine 304 can store information that describes an FoV. This information may be historical data used to track trends and anticipate behaviors and traffic conditions or may be instantaneous or real-time data that describes the FoV at a moment in time or over a window in time. The ability to store this data enables the perception engine 304 to make decisions that are strategically targeted at a particular point or area within the FoV. For example, the FoV may be clear (e.g., no echoes received) for a period of time (e.g., five minutes), and then one echo arrives from a specific region in the FoV: this is similar to detecting the front of a car. In response, the perception engine 304 may determine to narrow the beam width for a more focused view of that sector or area in the FoV. The next scan may indicate the targets' length or other dimension, and if the target is a vehicle, the perception engine 304 may consider what direction the target is moving and focus the beams on that area. Similarly, the echo may be from a spurious target, such as a bird, which is small and moving quickly out of the path of the vehicle. The database 352 coupled to the perception engine 304 can store useful data for radar system 300, such as, for example, information on which subarrays of the transmit antennas 308 and 309 perform better under different conditions.

In various examples described herein, the use of radar system 300 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 300, the driver (or driverless vehicle) may maintain the maximum safe speed without regard to the weather conditions. Even if other drivers slow down, a vehicle enabled with the radar system 300 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 304 adjusts the focus of the RF beam to a larger beam width, thereby enabling a faster scan of areas where there are few echoes. The perception engine 304 may detect this situation by evaluating the number of echoes received within a given time period and making beam size adjustments accordingly. Once a target is detected, the perception engine 304 determines how to adjust the beam focus. This is achieved by changing the specific configurations and conditions of the transmit antennas 308. In one example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 300.

All of these detection scenarios, analysis and reactions may be stored in the perception engine 304, such as in the database 352, and used for later analysis or simplified reactions. For example, if there is an increase in the echoes received at a given time of day or on a specific highway, that information is fed into the microcontroller 338 to assist in proactive preparation and configuration of the transmit antennas 308 and 309. Additionally, there may be some subarray combinations that perform better, such as to achieve a desired result, and this is stored in the database 352.

Figure 4:
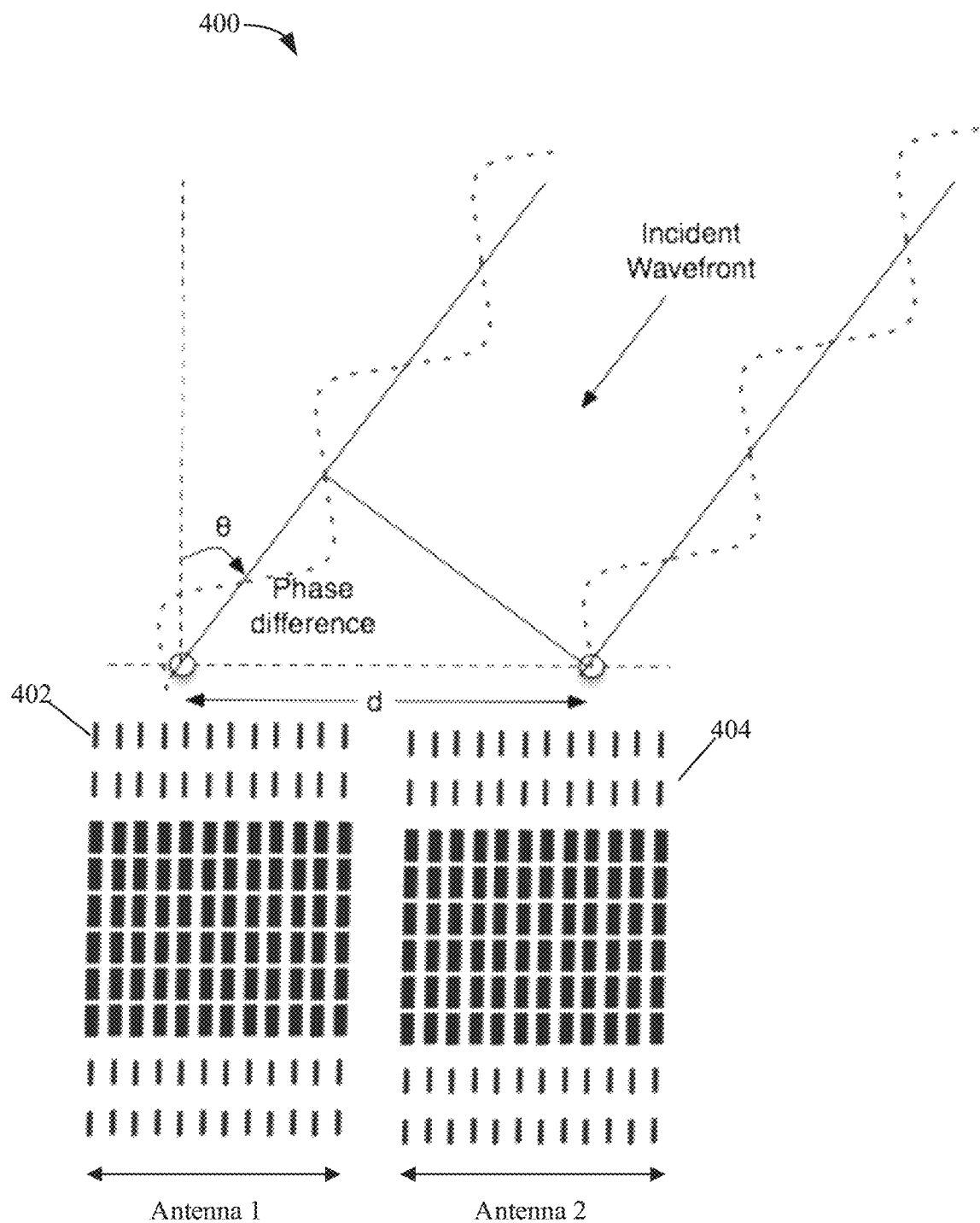
FIG. 4 conceptually illustrates a schematic diagram of a phase-comparison monopulse technique for computing angle-of-arrivals for the beam steering radar system as in FIG. 3 and in accordance with one or more implementations of the subject technology.

FIG. 4 conceptually illustrates a phase-comparison monopulse technique 400 for computing AoA information in the monopulse module 364 of the beam steering radar system 300 of FIG. 3 and in accordance with one or more implementations of the subject technology. The phase-comparison monopulse technique 400 can accurately estimate the AoA of a received radar signal from the phase difference of the signal measured on two (or more) receive antennas 402 and 404, which are implemented in various examples as 24-element antennas in a 48-element receive antenna as in receive antennas 312 and 313, respectively, in FIG. 3. With antennas 402 and 404 separated by a distance d, and a received wavefront signal incident at an angle θ, then the extra path that the signal must travel between antenna 402 and antenna 404 results in a phase difference, ΔΦ, between the two antennas. This can be used to calculate the AoA (e.g., θ) as follows:

$$\theta = \sin^{-1}\left(\frac{\lambda \Delta \phi}{2\pi d}\right) \quad \text{(Eq. 1)}$$

where λ is the wavelength of the received radar beam. In other implementations, the AoA can be calculated as follows:

$$\theta = \tan^{-1}\frac{RX_2 - RX_1}{RX_2 + RX_1} \quad \text{(Eq. 2)}$$

where $RX_i$ (for i is a positive integer) represents the phase information of the respective receiver antenna.

In various examples, the phase-comparison monopulse technique 400 can accurately determine AoA for received beams at a small angular resolution of about 1°. However, for most autonomous driving scenarios where it is imperative to localize, detect and identify objects accurately at both short and long ranges, this angular resolution may not be sufficient to satisfy certain criteria for safe autonomous driving. In situations where two objects are closer apart inside a main beam, the phase-comparison monopulse technique 400 may perceive the two objects as a single object. This is not acceptable in real driving situations, as this would lead an ego vehicle to make erroneous decisions that would impact its operation of the vehicle. Accordingly, the guard band antennas are used to discriminate between multiple objects inside a guard monopole beam as described in more detail hereinbelow.

Figure 5:
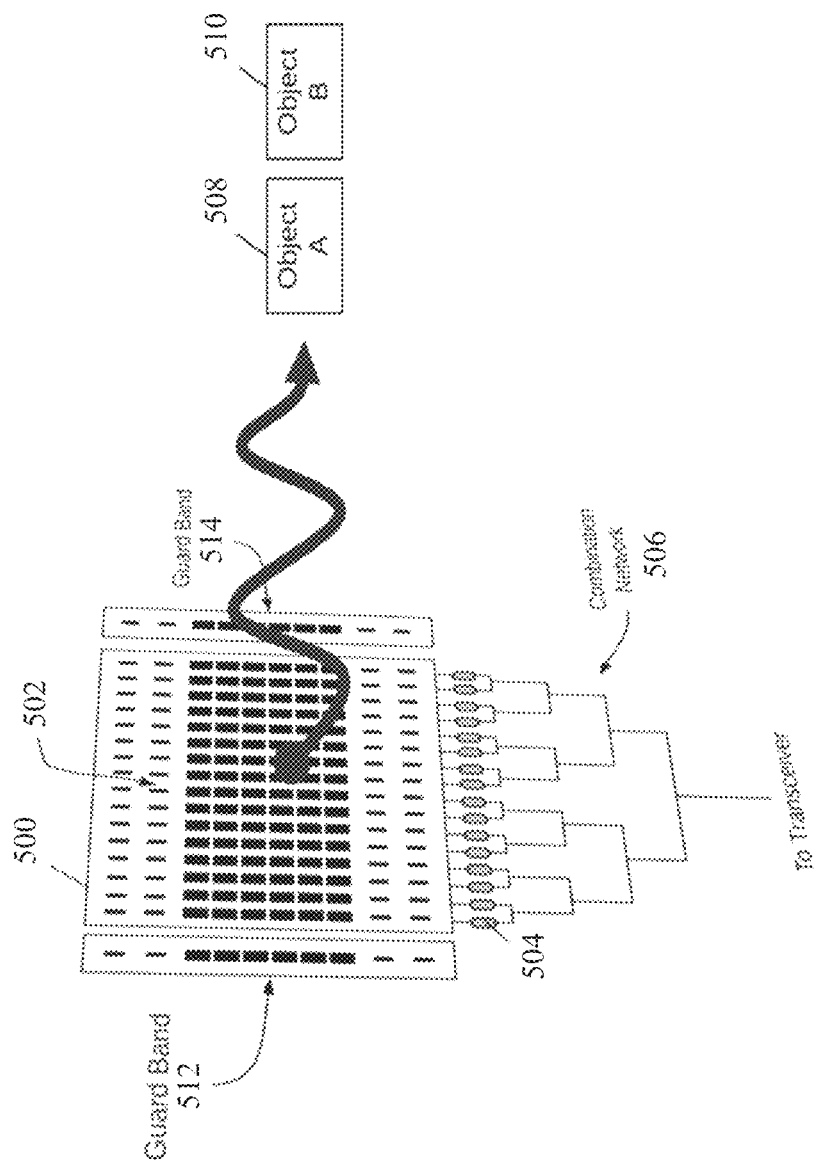
FIG. 5 illustrates a schematic diagram of guard band antennas in more detail and in accordance with one or more implementations of the subject technology.

Attention is now directed to FIG. 5, which illustrates the receive guard antennas as in FIG. 3 in more detail. Receive antenna 500 has a number of radiating elements 502 creating receive paths for signals or reflections from an object at a slightly different time. The radiating elements 502 may be meta-structures in some implementations, or patches in other implementations, in an array configuration such as in a 48-element antenna. The phase and amplification modules 504 provide phase shifting to align the received RF signals. The radiating elements 502 are coupled to the combination structure 506 and to phase and amplification modules 504, including phase shifters and LNAs implemented as PS circuits 320 and 322 and LNAs 341 and 342 of FIG. 3. In the present illustration, two objects, object A 508 and object B 510, are located at a same range and are moving at a same velocity with respect to the receive antenna 500. When the angular distance between the objects (e.g., 508 and 510) is lesser than the bandwidth of a radiation beam, the objects may be indistinguishable by the receive antenna 500. This is referred to as angular resolution or spatial resolution. In the radar and object detection fields, the angular resolution describes the radar's ability to distinguish between objects positioned proximate each other, in which the proximate location is generally measured by the range from an object detection mechanism, such as a radar antenna, to the objects and the velocity of the objects.

Radar angular resolution is the minimum distance between two equally large targets at the same range which the radar can distinguish and separate spatially. The angular resolution is a function of the antenna's half-power beam width, referred to as the 3 dB beam width and serves as a limiting factor to object differentiation. Distinguishing objects is based on accurately identifying the angle of arrival of reflections from the objects. Smaller beam width angles result in high directivity and more refined angular resolution but requires faster scanning to achieve the smaller step sizes. For example, in autonomous vehicle applications, the radar is tasked with scanning an environment of the vehicle within a sufficient time period for the vehicle to take corrective action when needed. This limits the capability of a system to specific steps. This means that any object having a distance therebetween less than the 3 dB angle beam width cannot be distinguished without additional processing. In other words, two identical targets at the same distance can be resolved in angle if they are separated by more than the antenna 3 dB beam width. The present examples use the multiple guard band antennas 312 and 314 to distinguish between the objects in the event that the monopulse detection technique cannot resolve the objects at such angular distance.

Figure 6:
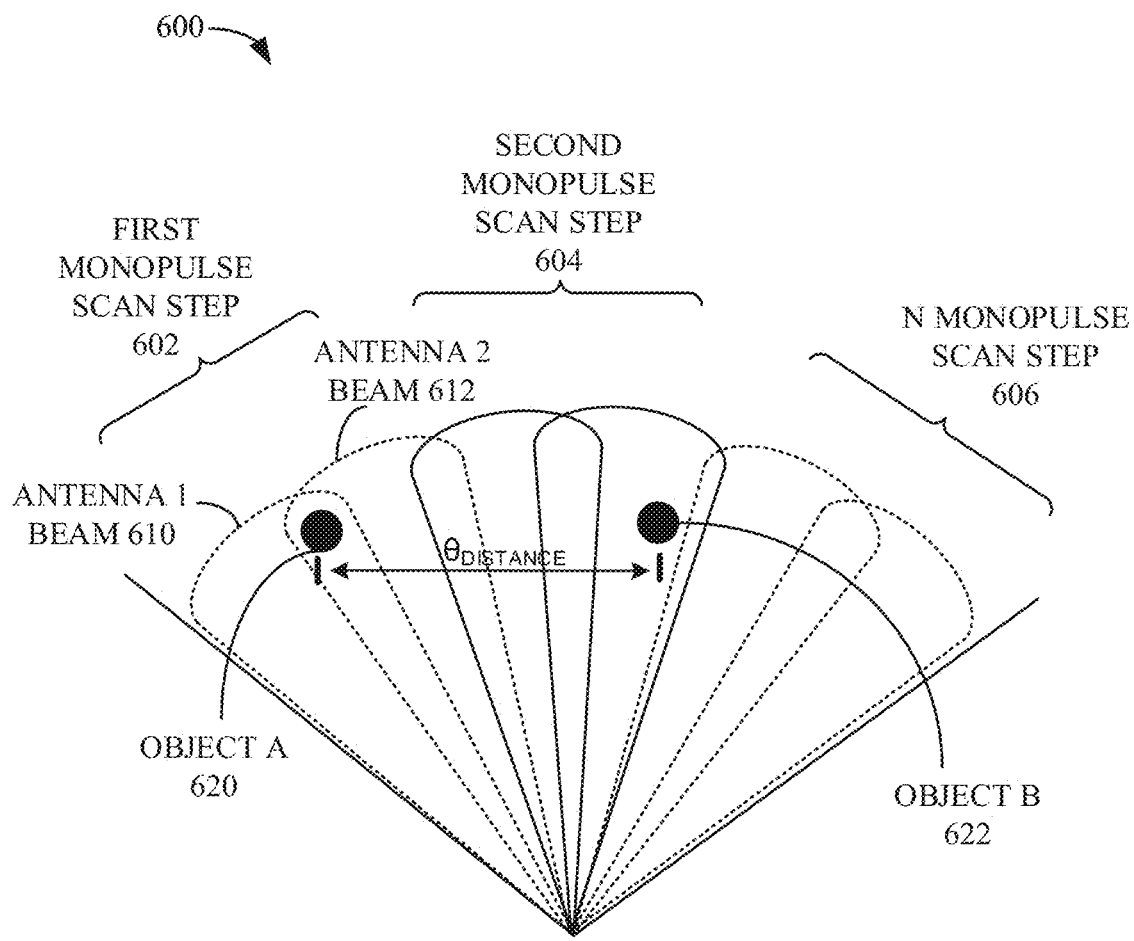
FIG. 6 conceptually illustrates a schematic diagram of a scanning range for a phase-comparison monopulse technique for resolving objects in accordance with one or more implementations of the subject technology.

FIG. 6 conceptually illustrates a schematic diagram of a scanning range 600 for a phase-comparison monopulse technique for resolving objects in accordance with one or more implementations of the subject technology. The scanning range 600 includes a first monopulse scan step 602 where a first antenna beam 610 (depicted as "Antenna 1") and a second antenna beam 612 (depicted as "Antenna 2") represent return radar signals as delayed reflections of transmission signals radiated in a same direction by separate transmit antennas. Within the first monopulse scan step 602, an object A 620 is detected. The phase-comparison monopulse technique includes determining the phase difference between the two antenna beams to determine an angle of arrival of the object A 620. The scanning range 600 includes a second monopulse scan step 604 that is an incremental scan from the first monopulse scan step 602. The second monopulse scan step 604 also includes the first and second antenna beams 610 and 612 for scanning the surrounding environment. Within the second monopulse scan step 604, an object B 622 is detected. The phase-comparison monopulse technique includes determining the phase difference between the two antenna beams to determine an angle of arrival of the object B 622. The scanning range 600 also includes a third monopulse scan step 606 using the first and second antenna beams 610 and 612. The phase-comparison monopulse technique may determine the angular distance (denoted as "$\theta_{DISTANCE}$") between the two detected objects (e.g., 620, 622). In some implementations, the phase-comparison monopulse technique may compare the computed angular distance against a predetermined threshold to determine whether the objects are resolved. If the angular distance is greater than the predetermined threshold (e.g., 0.5°), then the detected objects can be resolved as two distinct objects by the phase-comparison monopulse detection. Otherwise, the detected objects are indistinguishable by the phase-comparison monopulse technique. In some embodiments, the results from the phase-comparison monopulse comparison can initiate the guard channel detection for angular resolution refinement.

Figure 7A:
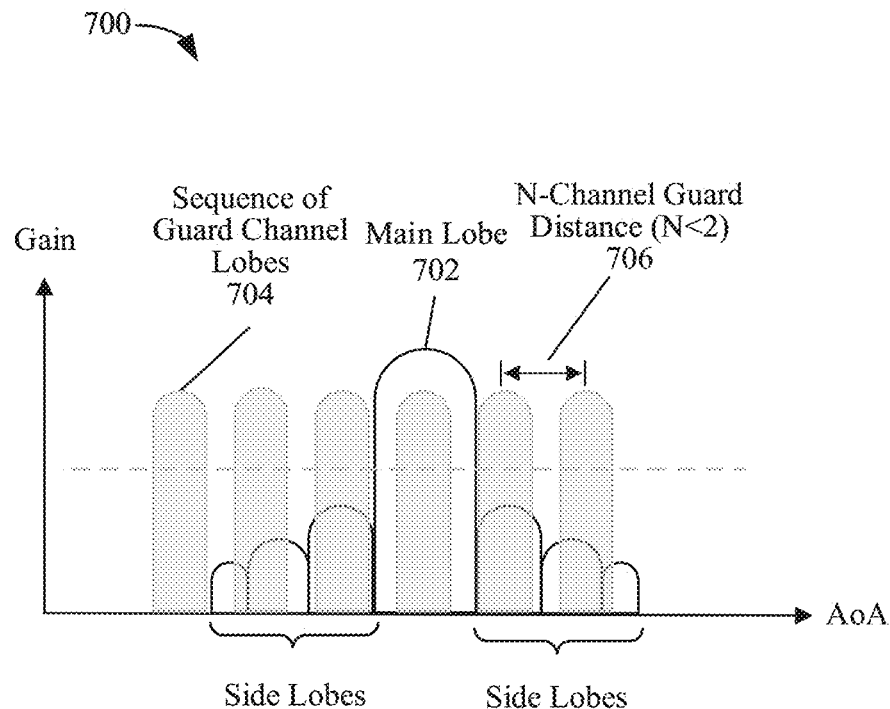
FIGS. 7A and 7B illustrate exemplary graphs of a main lobe with side lobes and a sequence of guard channel lobes with different N-channel guard distances in accordance with one or more implementations of the subject technology.
Figure 7B:
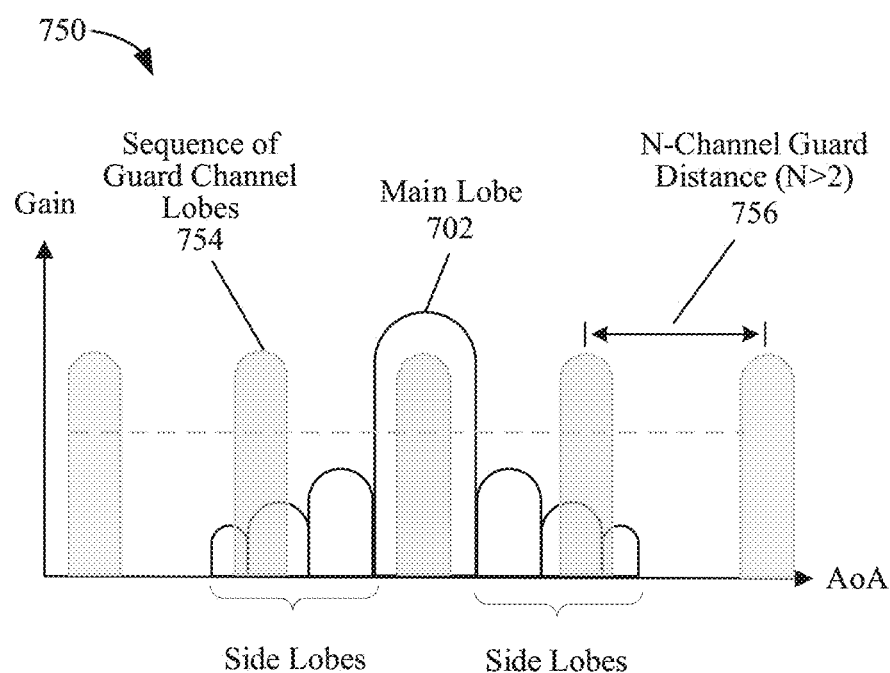

FIGS. 7A and 7B illustrate exemplary graph of a main lobe with side lobes and a sequence of guard channel lobes with different N-channel guard distances in accordance with one or more implementations of the subject technology. In FIG. 7A, a main lobe 702 with side lobes that results from the main radiating elements of the antenna structure is illustrated by a plot of gain (e.g., y-axis) versus angle of arrival (e.g., x-axis denoted as "AoA"). In addition to and separate from the main lobe 702 is a sequence of guard channel lobes 704. These guard channel lobes are used to filter signals above a gain level of a single guard channel. In some implementations, using two guard channels results in the sequence of guard channel lobes 704 having an N-channel guard distance 706 when N is at or lesser than 2 guard channels. In some implementations, the guard channel detection can be initiated to resolve objects indistinguishable by the monopulse detection based at least on whether the angular distance between the detected objects is lesser than a fraction of the beam width of the main lobe 702.

In FIG. 7B, the guard channel lobes are depicted as a sequence of guard channel lobes 754 having an N-channel guard distance 756, when N is greater than 2 guard channels. In some implementations, the N-channel guard distance 756 is greater than the N-channel guard distance 706. In some embodiments, the N-channel guard distances increase as the number of guard channels increases for detection. Because the guard channel lobes are farther spaced apart in this example, the guard channel detection can be initiated to resolve objects indistinguishable by the monopulse detection irrespective of the beam width of the main lobe 702.

Figure 8:
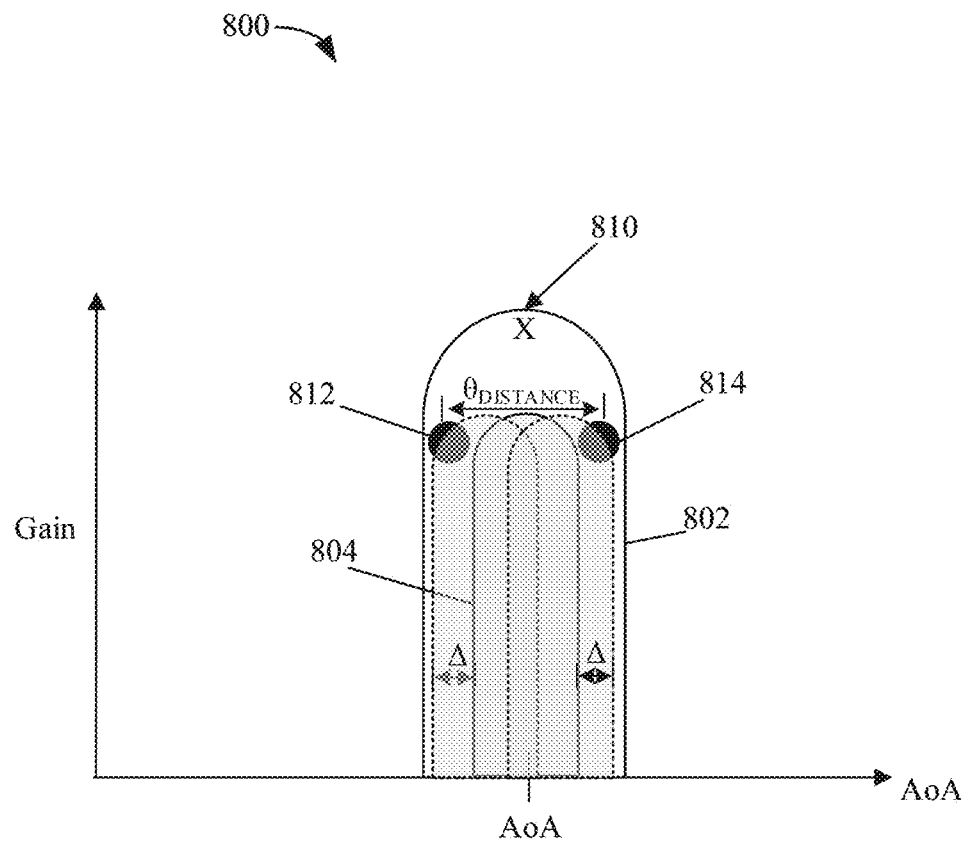
FIG. 8 illustrates an exemplary graph of a guard channel scan within a main lobe for resolving objects in accordance with one or more implementations of the subject technology.

FIG. 8 illustrates an exemplary graph of a guard channel scan within a main lobe 802 using a sequence of guard channel lobes 804 for resolving objects in accordance with one or more implementations of the subject technology. In this example, two targets have an angular resolution (denoted as "$\theta_{DISTANCE}$") that is less than the beam width of the main lobe 802 (e.g., lesser than 3 dB bandwidth) and are therefore effectively indistinguishable by the phase-comparison monopulse detection alone. For example, the radar system may discern these objects as a single object located at location X 810 that corresponds to the AoA. The objects are actually located at positions 812 and 814. As the radar identifies location 810 with the phase-comparison monopulse detection, the present example evaluates the guard lobe amplitudes to identify the object at this AoA. The N-channel guard detection can be used to scan within the beam width of the main lobe 802 by a predetermined delta distance (denoted as Δ). For example, the guard channel lobe 804 can scan left to detect the object at position 812 and scan to the right to detect another object at position 814. In doing so, the guard channel scan produces a graph of measured gain that can identify a null between the detected objects at positions 812 and 814 as will be described in more detail in FIG. 9. In some implementations, if the object is not detected by the guard band at the AoA, then the radar may be instructed to look for multiple objects. This may involve refining the scan of the main lobe 802 or of the guard lobes.

Figure 9:
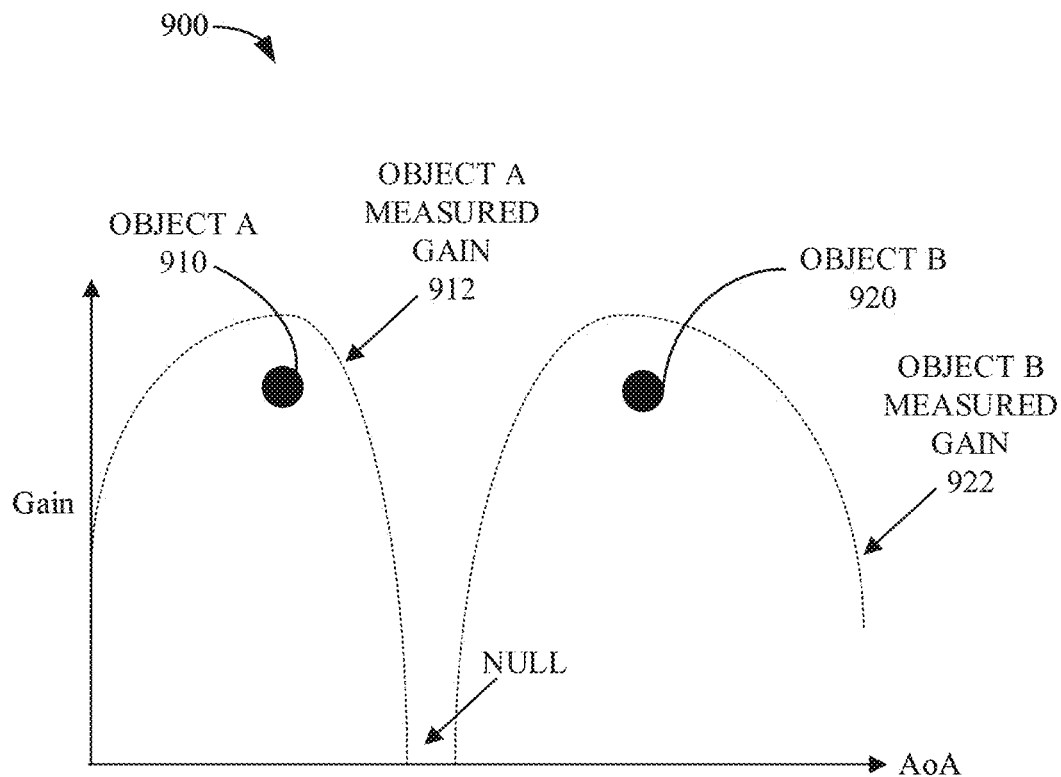
FIG. 9 illustrates an exemplary graph of measured gain of the resolved objects using the guard channel scan in accordance with one or more implementations of the subject technology.

FIG. 9 illustrates an exemplary graph 900 of measured gain of the resolved objects using the guard channel scan in accordance with one or more implementations of the subject technology. The graph 900 includes gain measurements of object A 910 and object B 920. As the guard channel lobe approaches object A 910, the gain value (denoted as "Object A Measured Gain 912") increases and reaches a peak value at the corresponding position of object A 910 and the gain value decreases as the guard channel lobe recedes away from the object A 910. Similarly, the gain value (denoted as "Object B Measured Gain 922") increases and reaches a peak value at a corresponding position of object B 920 when the guard channel lobe approaches object B 920 and the gain value decreases as the guard channel lobe recedes away from the object B 920. Additionally, the graph 900 identifies a null between the object A 910 and object B 920, which indicates that the object A 910 and object B 920 are distinguishable and separate objects. In this respect, the guard channel detect can resolve the two objects 910 and 920.

Figure 10:
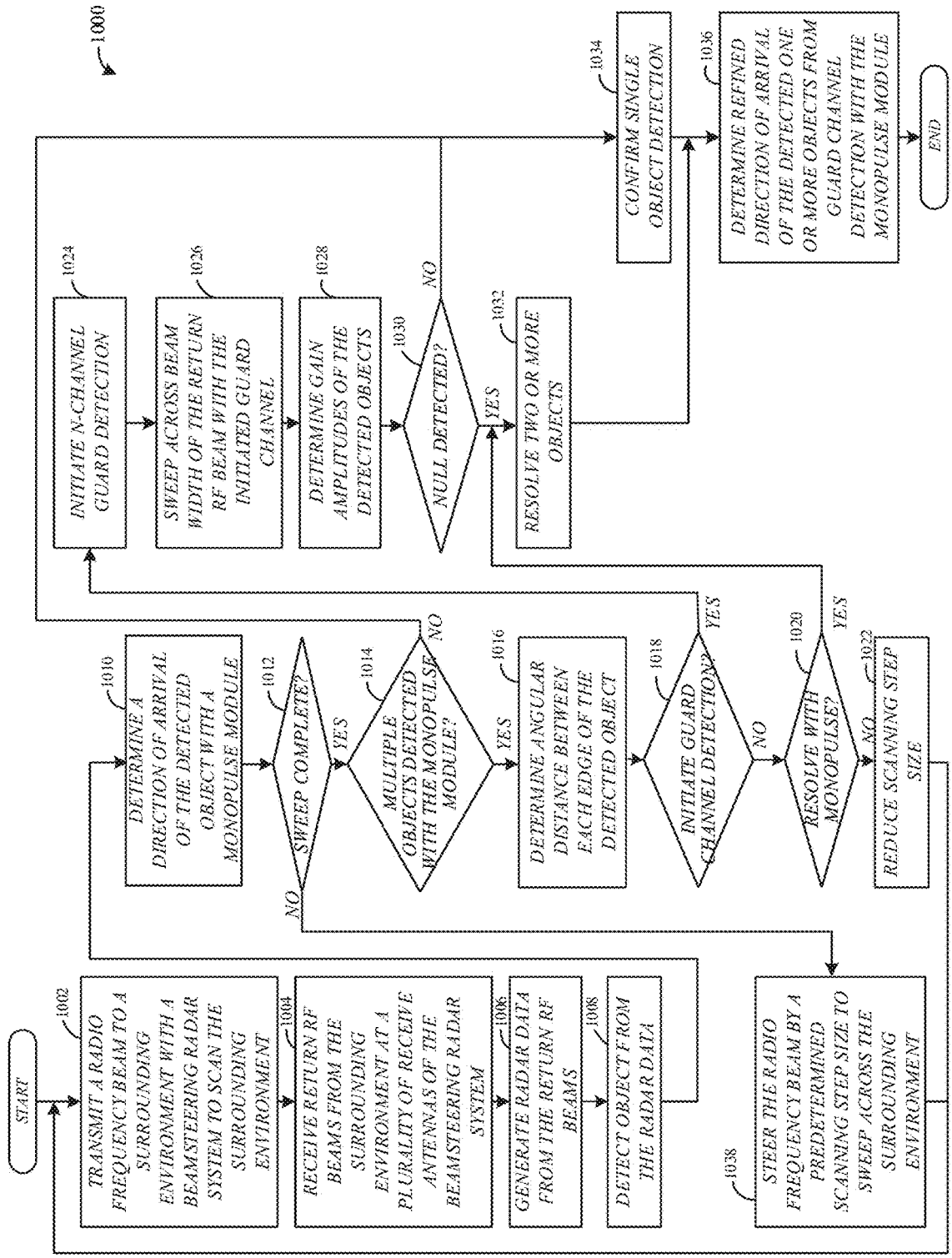
FIG. 10 illustrates a flowchart of an example process of angular resolution refinement in a vehicle radar for object identification, in accordance with various implementations of the subject technology.

The guard band antennas and the monopulse module of FIG. 4 are both used for angular resolution refinement in a beam steering radar as in FIG. 3 and as illustrated in FIG. 10. Attention is now directed to FIG. 10, which illustrates a flowchart of an example process 1000 of angular resolution refinement in a vehicle radar for object identification, in accordance with various implementations of the subject technology. For explanatory purposes, the example process 1000 is primarily described herein with reference to FIGS. 3, 6 and 8; however, the example process 1000 is not limited to the radar system 300 of FIG. 3, and the example process 1000 can be performed by one or more other components of the radar system 300 of FIG. 3, such as, for example, the monopulse module 357. Further for explanatory purposes, the blocks of the example process 1000 are described herein as occurring in serial, or linearly. However, multiple blocks of the example process 1000 can occur in parallel. In addition, the blocks of the example process 1000 can be performed in a different order than the order shown and/or one or more of the blocks of the example process 1000 are not performed.

The process 1000 begins at step 1002, where a radio frequency beam is transmitted to a surrounding environment with a beamsteering radar system to scan the surrounding environment. In some implementations, the scan is performed within an angular range of −20° to +20°. In other aspect, the scan is performed within an angular range of −30° to +30°.

Next, at step 1004, return RF beams are received from the surrounding environment at a plurality of receive antennas of the beamsteering radar system. For example, the return RF beams are received by the receive antennas 312 and 313. Subsequently, at step 1006, radar data is generated from the return RF beams. Next, at step 1008, an object is detected from the radar data.

Subsequently, at step 1010, a direction of arrival of the detected object is determined with a monopulse module. Depending on the location of the object reflecting off the return RF beams, the phase information measured by the beamsteering radar system may be different such that the direction of arrival can be measured from the phase difference.

Next, at step 1012, a determination is made as to whether the monopulse scan sweep is complete. For example, the monopulse scan can sweep across a FoV in an angular range of −20° to +20° in some implementations, or in an angular range of −30° to +30°. In some aspects, the sweep may include one or more scan steps (as described in FIG. 6). If the sweep is complete, the process 1000 proceeds to step 1014. Otherwise, the process 1000 proceeds to step 1038.

At step 1014, a determination is made as to whether multiple objects are detected with the monopulse module (e.g., 357). In some implementations, the monopulse module may determine whether multiple edges of objects are present within the monopulse scan sweep. If multiple objects are detected, then the process 1000 proceeds to step 1016. Otherwise, the process 1000 proceeds to step 1034.

Subsequently, at step 1016, an angular distance between each edge of the detected objects is determined. In some implementations, the monopulse module may measure the edge-to-edge distance between the detected objects. Next, at step 1018, a determination is made as to whether a guard channel detection is initiated. For example, if the edge-to-edge distance between the detected objects is lesser than a beam width of the main lobe, then the guard channel detection may be suitable to perform further angular resolution refinement. In some examples, the guard channel detection is initiated if the angular distance is lesser than a fraction of the main lobe beam width. For example, the guard channel detection may be initiated when the angular distance is, at or lesser than, about 1.2° whereas the main lobe beam width is about 1.8°. If the guard channel detection is initiated, the process 1000 proceeds to step 1024. Otherwise, the process 1000 proceeds to step 1020.

Next, at step 1020, a determination is made as to whether the angular distance measured is resolvable by the monopulse module 357. For example, if the angular distance is greater than the predetermined threshold (e.g., 0.5°), then the detected objects can be resolved as two distinct objects by the monopulse module 357. In this respect, the process 1000 then proceeds to step 1032. Otherwise, the detected objects are indistinguishable by the monopulse module 357. Subsequently, at step 1022, the scanning step size of the phase-comparison monopulse detection is reduced. Next, the process 1000 proceeds back to step 1002.

At step 1024, an N-channel guard detection is initiated. Subsequently, at step 1026, the initiated guard channel lobe sweeps inside the beam width of the return RF beam by a predetermined delta distance (as described in FIG. 8). Next, at step 1028, the gain amplitudes of the detected objects are determined with the guard channel lobe detection. Subsequently, at step 1030, a determination is made as to whether a null is detected from the gain amplitudes. If a null is detected, the process 1000 proceeds to step 1032. Otherwise, the process 1000 proceeds to step 1034.

At step 1032, the two or more detected objects are resolved. Alternatively, at step 1034, the process 1000 proceeds with confirming the single object detection. Subsequently after either step 1032 or step 1034, a refined direction of arrival of the detected one or more objects are determined from the guard channel detection with the monopulse module.

Referring back to when the monopulse scan sweep is not complete, at step 1038, the radio frequency beam is steered by a predetermined scanning step size to sweep across the surrounding environment. For example, the monopulse scan can sweep across a FoV in an angular range of −20° to +20° in some implementations, or in an angular range of −30° to +30°. In some implementations, the sweep may include one or more scan steps (as described in FIG. 6).

Figure 11:
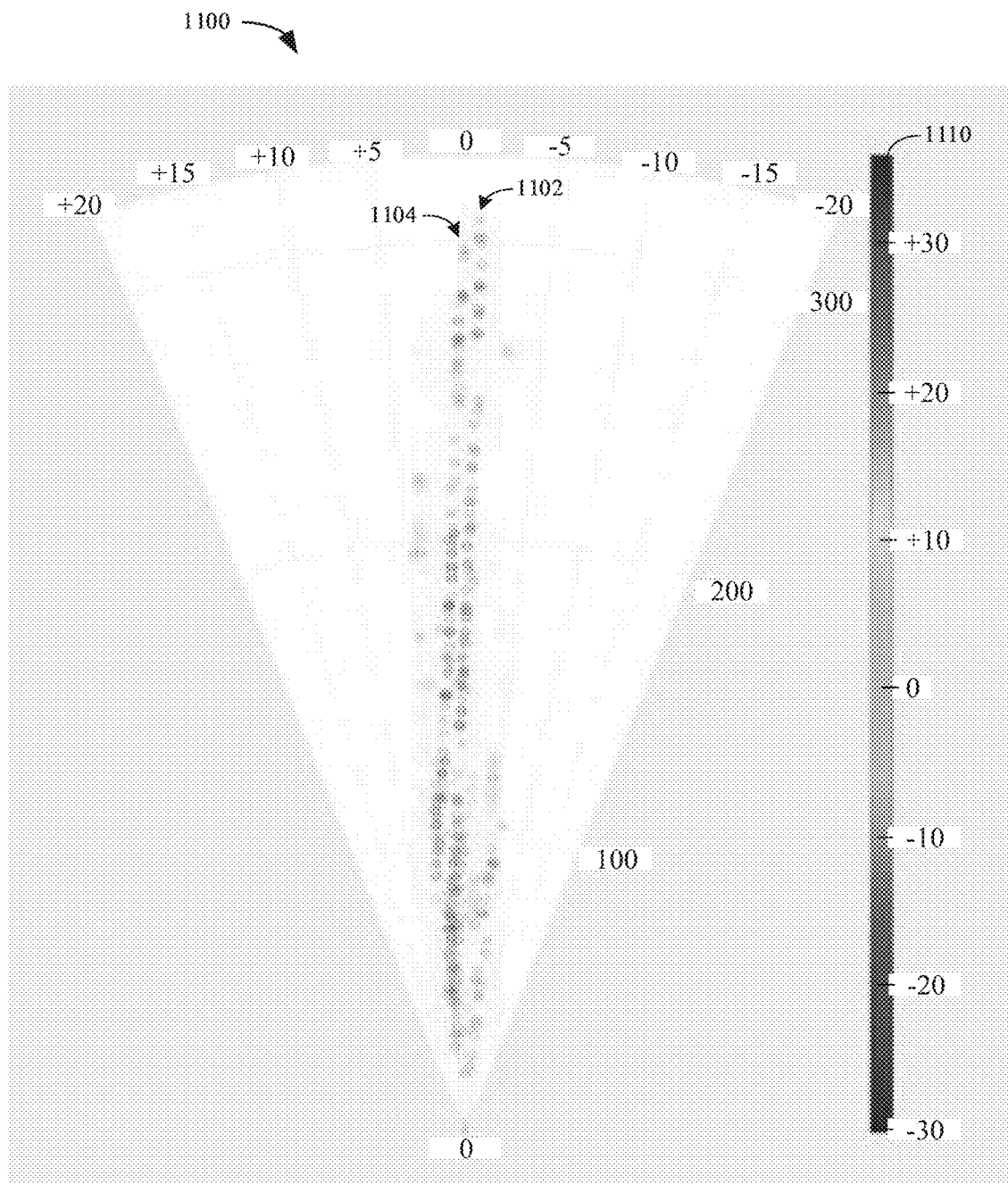
FIG. 11 illustrates an exemplary graph of road map data generated from the phase-comparison monopulse technique and guard band antennas in accordance with various implementations of the subject technology.

FIG. 11 illustrates an exemplary graph 1100 of road map data generated from the phase-comparison monopulse technique and guard band antennas in accordance with various implementations of the subject technology. The graph 1100 includes a two-dimensional plot that indicates range and angular range of directions of arrival for detected objects. For example, the plot 1100 indicates range measurements in the range of 0 to about 330 meters and indicates angle-of-arrival measurements in the range of −20° to +20°. Additionally, the plot 1100 is accompanied by a legend 1110 that indicates the range of velocity values assigned to the detected objects that represent the Doppler effect of these objects. In some implementations, the legend 1110 indicates velocities in the range of 0 to about +30 m/s for objects moving away (or receding) from a radar (e.g., the radar system 300), and velocities in the range of −30 m/s to 0 m/s for objects moving toward the radar. For example, objects 1102 represent moving vehicles traveling away from the radar at different ranges relative to the radar assigned with different markings that represent different velocities between 0 m/s and +30 m/s. Similarly, objects 1104 represent moving vehicles traveling toward the radar at different ranges relative to the radar assigned with different markings that represent different velocities between −30 m/s and 0 m/s. With the use of the phase-comparison monopulse detection that produces the angle-of-arrival information from each of the detected objects and the use of the guard channel lobe detection for resolving objects at more proximate angular distances, the radar can delineate between two-lane traffic moving in opposite directions that can be very helpful to increase the safety performance of ego vehicles (or autonomous vehicles) that implement such radar systems with angular resolution refinement.

The beam steering radar system described herein above supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

In accordance with various embodiments described herein, a radar system for use in autonomous vehicles is provided. The radar system includes an antenna module configured to radiate one or more transmission radio frequency (RF) beams to a surrounding environment and receive one or more return RF beams reflected from the surrounding environment, and a processing engine coupled to the antenna module and configured to detect and identify a plurality of objects from the one or more return RF beams. The processing engine of the radar system includes a monopulse module configured to determine a direction of arrival of each of the plurality of objects and determine an angular distance between the plurality of objects from the direction of arrival of each of the plurality of objects.

In various embodiments, the antenna module includes one or more transmit antennas, a plurality of receive antennas, and a plurality of receive guard antennas. In various embodiments, the one or more transmit antennas are configured to radiate the one or more transmission radio frequency (RF) beams to the surrounding environment, wherein the plurality of receive antennas are configured to receive the one or more return RF beams reflected from the surrounding environment and generate radar data from the one or more return RF beams, and wherein the plurality of receive guard antennas are configured to receive the one or more return RF beams.

In various embodiments, the antenna module is further configured to initiate a guard channel detection with the plurality of receive guard antennas when two or more of the plurality of detected objects are indistinguishable. In some embodiments, the antenna module is further configured to determine gain amplitudes of the one or more return RF beams with the guard channel detection: determine a null between the plurality of objects from the gain amplitudes; and resolve the plurality of objects as separate objects based at least on the determined null.

In some embodiments, the monopulse module is further configured to determine a refined direction of arrival of the plurality of objects based at least on the resolved plurality of objects from the guard channel detection. In some instances, the monopulse module is further configured to compare the determined angular distance against a predetermined threshold to determine whether the objects are resolved. In various embodiments, the monopulse module is configured to determine phase differences between the one or more return RF beams to determine an angle of arrival of each of the plurality of objects. In some embodiments, the processing engine includes a perception engine configured to identify the plurality of detected objects with one or more neural networks using machine learning or computer vision techniques.

In accordance with various embodiments, a method of angular resolution refinement is provided. The method includes transmitting one or more radio frequency (RF) beams to a surrounding environment; receiving one or more return RF beams from the surrounding environment; generating radar data from the one or more return RF beams; detecting a plurality of objects from the radar data: determining a direction of arrival of each of the plurality of objects; and determining an angular distance between the plurality of objects based on the determined direction of arrival of each of the plurality of objects.

In some embodiments, the transmitting and receiving are via a beamsteering radar system that includes one or more transmit antennas, a plurality of receive antennas, and a plurality of receive guard antennas. In various embodiments, the method further includes identifying the plurality of detected objects with one or more neural networks using machine learning or computer vision techniques. The method further includes, in some embodiments, initiating a guard channel detection based at least on the determined angular distance; determining gain amplitudes of the one or more return RF beams with the guard channel detection; determining a null between the plurality of objects from the determined gain amplitudes; and resolving the plurality of objects as separate objects based at least on the determined null.

In various embodiments, the method also includes determining a refined direction of arrival of the plurality of objects based at least on the resolved plurality of objects from the guard channel detection. In some embodiments, the initiating of the guard channel detection occurs when the determined angular distance between the two or more of the plurality of detected objects are lesser than a fraction of a beam width of a main lobe of the one or more return RF beams.

In accordance with various embodiments, a radar system for use in autonomous vehicles is provided. The radar system includes an antenna module comprising one or more transmit antennas, a plurality of receive antennas, and a plurality of receive guard antennas. In some embodiments, the one or more transmit antennas are configured to radiate one or more transmission radio frequency (RF) beams to a surrounding environment, the plurality of receive antennas are configured to receive one or more return RF beams reflected from the surrounding environment and generate radar data from the one or more return RF beams, and the plurality of receive guard antennas are configured to receive the one or more return RF beams. The radar system also includes a processing engine coupled to the antenna module and configured to detect and identify a plurality of objects from the one or more return RF beams.

In some embodiments, the processing engine includes a monopulse module configured to determine phase differences between the one or more return RF beams to determine an angle of arrival of each of the plurality of objects. In various embodiments, the processing engine includes a monopulse module configured to determine a direction of arrival of each of the plurality of objects and determine an angular distance between the plurality of objects from the direction of arrival of each of the plurality of objects. In some embodiments, the antenna module is further configured to: initiate a guard channel detection with the plurality of receive guard antennas based at least on the determined angular distance; determine gain amplitudes of the one or more return RF beams with the guard channel detection; determine a null between the plurality of objects from the gain amplitudes; and resolve the plurality of objects as separate objects based at least on the determined null. In various embodiments, the monopulse module is further configured to determine a refined direction of arrival of the plurality of objects based at least on the resolved plurality of objects from the guard channel detection.

It is appreciated that the previous description of the disclosed examples is provided to enable any person skilled in the art to make or use the present disclosure. Various modifications to these examples will be readily apparent to those skilled in the art, and the m spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar system for use in an autonomous vehicle, comprising:
a radiating structure having a plurality of radiating elements configured to radiate one or more transmission radio frequency (RF) beams to a surrounding environment of the autonomous vehicle and receive one or more return RF beams reflected from the surrounding environment, wherein the radiating structure comprises one or more transmit antennas and a plurality of receive antennas;
a transceiver coupled to the radiating structure;
a processing engine coupled to the radiating structure and configured to detect and identify a plurality of objects from the one or more return RF beams, wherein the processing engine comprises: a digital signal processor configured to generate monopulse signals and configured to determine a direction of arrival of each reflection of the plurality of objects and to determine an angular distance between the plurality of objects from the direction of arrival of each of the plurality of objects,
wherein the direction of arrival of each reflection is determined based on a phase difference of the reflection received at two or more receive antennas of the plurality of receive antennas, and
wherein the digital signal processor is further configured to initiate a guard channel detection and resolve with the monopulse signals; and
a microcontroller configured to provide scan parameters to the transceiver.

2. The radar system of claim 1, wherein the radiating structure further comprises a plurality of receive guard antennas, and wherein the plurality of receive guard antennas are configured to receive the one or more return RF beams.

3. The radar system of claim 1, wherein the one or more transmit antennas are configured to radiate the one or more transmission radio frequency (RF) beams to the surrounding environment, wherein the plurality of receive antennas are configured to receive the one or more return RF beams reflected from the surrounding environment and generate radar data from the one or more return RF beams.

4. The radar system of claim 2, wherein the radiating structure is further configured to:
initiate the guard channel detection with the plurality of receive guard antennas when two or more of the plurality of detected objects are indistinguishable by the radar system.

5. The radar system of claim 4, wherein the radiating structure is further configured to:
determine gain amplitudes of the one or more return RF beams with the guard channel detection;
determine a null between the plurality of objects from the gain amplitudes; and
resolve the plurality of objects as separate objects based at least on the determined null.

6. The radar system of claim 5, wherein the digital signal processor is further configured to determine a refined direction of arrival of the plurality of objects based at least on the resolved plurality of objects from the guard channel detection.

7. The radar system of claim 5, wherein the digital signal processor is further configured to compare the determined angular distance against a predetermined threshold to determine whether the objects are resolved.

8. The radar system of claim 1, wherein the digital signal processor is further configured to determine phase differences between the one or more return RF beams to determine an angle of arrival of each of the plurality of objects.

9. The radar system of claim 1, wherein the processing engine comprises a perception engine configured to identify the plurality of detected objects with one or more neural networks using machine learning or computer vision techniques.

10. A method of angular resolution refinement for a radar system, comprising:
generating monopulse signals;
transmitting one or more radio frequency (RF) beams to a surrounding environment of the radar system;
receiving one or more return RF beams from the surrounding environment;
generating radar data from the one or more return RF beams;
detecting a plurality of objects from the radar data;
determining a direction of arrival of each of the plurality of objects based on the monopulse signals, wherein the direction of arrival of each object is determined based on a phase difference of a return RF beam from the surrounding environment received at two or more receive antennas of the radar system;
initiating a guard channel detection;
resolving the guard channel detection with the monopulse signals; and
determining an angular distance between the plurality of objects based on the monopulse signals and the direction of arrival of each of the plurality of objects.

11. The method of claim 10, wherein the transmitting and receiving are via the radar system that comprises one or more transmit antennas, a plurality of receive antennas, and a plurality of receive guard antennas.

12. The method of claim 10, further comprising:
identifying the plurality of detected objects with one or more neural networks using machine learning or computer vision techniques.

13. The method of claim 10, further comprising:
initiating the guard channel detection based at least on the determined angular distance;
determining gain amplitudes of the one or more return RF beams with the guard channel detection;
determining a null between the plurality of objects from the determined gain amplitudes; and
resolving the plurality of objects as separate objects based at least on the determined null.

14. The method of claim 13, further comprising:
determining a refined direction of arrival of the plurality of objects based at least on the resolved plurality of objects from the guard channel detection.

15. The method of claim 13, wherein the initiating of the guard channel detection occurs when the determined angular distance between the two or more of the plurality of detected objects are lesser than a fraction of a beam width of a main lobe of the one or more return RF beams.

16. A radar system for use in autonomous vehicles, comprising:

a set of antennas, comprising:
  one or more transmit antennas configured to radiate one or more transmission radio frequency (RF) beams to a surrounding environment,
  a plurality of receive antennas configured to receive one or more return RF beams reflected from the surrounding environment and generate radar data from the one or more return RF beams, and
  a plurality of receive guard antennas configured to receive the one or more return RF beams;
a microcontroller coupled to the set of antennas, wherein the microcontroller is configured to detect and identify a plurality of objects from the one or more return RF beams received at the receive guard antennas; and
a processing engine coupled to the microcontroller, the processing engine configured to determine an angle of arrival of each reflection based on a phase difference of the reflection received at two or more receive antennas of the plurality of receive antennas.

17. The radar system of claim 16, wherein the processing engine is further configured to determine phase differences between the one or more return RF beams to determine an angle of arrival of each of the plurality of objects.

18. The radar system of claim 16, wherein the processing engine is further configured to determine a direction of arrival of each of the plurality of objects and determine an angular distance between the plurality of objects from the direction of arrival of each of the plurality of objects.

19. The radar system of claim 18, wherein the set of antennas is further configured to:
  initiate a guard channel detection with the plurality of receive guard antennas based at least on the determined angular distance;
  determine gain amplitudes of the one or more return RF beams with the guard channel detection;
  determine a null between the plurality of objects from the gain amplitudes; and
  resolve the plurality of objects as separate objects based at least on the determined null.

20. The radar system of claim 19, wherein the processing engine is further configured to determine a refined direction of arrival of the plurality of objects based at least on the resolved plurality of objects from the guard channel detection.

* * * * *